(12) United States Patent
Nebel et al.

(10) Patent No.: US 12,417,526 B2
(45) Date of Patent: Sep. 16, 2025

(54) MEASUREMENT OF TEXTILE CORD COUNT FOR RUBBER SHEET CALENDERING

(71) Applicant: Honeywell International Inc., Charlotte, NC (US)

(72) Inventors: Tobias Nebel, North Vancouver (CA); Momcilo Gavrilov, North Vancouver (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 109 days.

(21) Appl. No.: 18/120,332

(22) Filed: Mar. 10, 2023

(65) Prior Publication Data

US 2024/0303797 A1  Sep. 12, 2024

(51) Int. Cl.
| | | |
|---|---|---|
| G06T 7/00 | (2017.01) | |
| B29D 30/00 | (2006.01) | |
| H04N 23/56 | (2023.01) | |
| G06V 10/48 | (2022.01) | |

(52) U.S. Cl.
CPC ........ *G06T 7/0004* (2013.01); *B29D 30/0061* (2013.01); *G06T 7/0002* (2013.01); *H04N 23/56* (2023.01); *B29D 2030/0066* (2013.01); *G06T 2207/20056* (2013.01); *G06T 2207/30124* (2013.01); *G06T 2207/30242* (2013.01); *G06V 10/48* (2022.01)

(58) Field of Classification Search
None
See application file for complete search history.

(56) References Cited

U.S. PATENT DOCUMENTS

| | | |
|---|---|---|
| 5,002,621 A | 3/1991 | Ikeda |
| 5,101,270 A | 3/1992 | Boone |
| 5,235,281 A | 8/1993 | Haragashira |
| | (Continued) | |

FOREIGN PATENT DOCUMENTS

| | | |
|---|---|---|
| CA | 2620191 A1 | 3/2007 |
| CN | 107901319 A | 4/2018 |
| | (Continued) | |

OTHER PUBLICATIONS

Stanley Sternberg, Biomedical Image Processing, IEEE Computer Jan. (1983), 22-34.

(Continued)

*Primary Examiner* — Tyler W. Sullivan
(74) *Attorney, Agent, or Firm* — Seager, Tufte & Wickhem, LLP

(57) ABSTRACT

Calculating cord parameters of a textile reinforced rubber sheet moving in the machine direction includes: (a) illuminating an area on a side of the sheet with radiation; (b) obtaining a digital image of an illuminated area; (c) generating a digital image of the outer surface; and (d) calculating cord parameters. The elongated textile cords are preferably parallel to each other the elongated textile cords are orientated in a cross direction which is perpendicular to the machine direction. Scanning or static camera with a light source can be employed, wherein the light is directionally perpendicular to the plurality of cords. Cord count per unit length, cord spacing, the presence of missing cords, and/or the presence of shifted cords can be determined.

19 Claims, 6 Drawing Sheets

(56) References Cited

U.S. PATENT DOCUMENTS

| | | | |
|---|---|---|---|
| 5,471,307 A * | 11/1995 | Koliopoulos | G01B 11/306 |
| | | | 356/613 |
| 7,282,724 B2 | 10/2007 | Olschewski | |
| 7,695,592 B2 | 4/2010 | Shakespeare | |
| 8,259,198 B2 | 9/2012 | Cote | |
| 8,897,593 B2 | 11/2014 | Suzuki | |
| 9,218,648 B2 | 12/2015 | McCloskey | |
| 9,646,221 B2 | 5/2017 | Takahashi | |
| 10,074,256 B2 | 9/2018 | Au | |
| 10,458,786 B2 | 10/2019 | Funane | |
| 11,237,627 B2 | 2/2022 | Gibby | |
| 11,257,388 B2 | 2/2022 | Shamasundar | |
| 11,335,006 B2 | 5/2022 | Wan | |
| 2016/0089806 A1 | 3/2016 | Takeuchi | |
| 2016/0327495 A1 * | 11/2016 | An | B29D 30/46 |
| 2019/0114763 A1 | 4/2019 | Gostein | |

FOREIGN PATENT DOCUMENTS

| | | | | |
|---|---|---|---|---|
| EP | 3090865 A1 | 11/2016 | | |
| EP | 3366462 B1 | 12/2021 | | |
| JP | H07167797 A | 7/1995 | | |
| JP | 2969036 B2 * | 11/1999 | | |
| JP | 2008203149 A * | 9/2008 | | |
| JP | 5448798 B2 * | 3/2014 | | |
| WO | WO-2005026660 A1 * | 3/2005 | ........... | G01B 11/303 |
| WO | WO-2018136622 A1 * | 7/2018 | ............. | A61B 18/22 |

OTHER PUBLICATIONS

Extended European Search Report, EP Application No. 24157612.3, European Patent Office, Aug. 19, 2024 (10 pages).

* cited by examiner

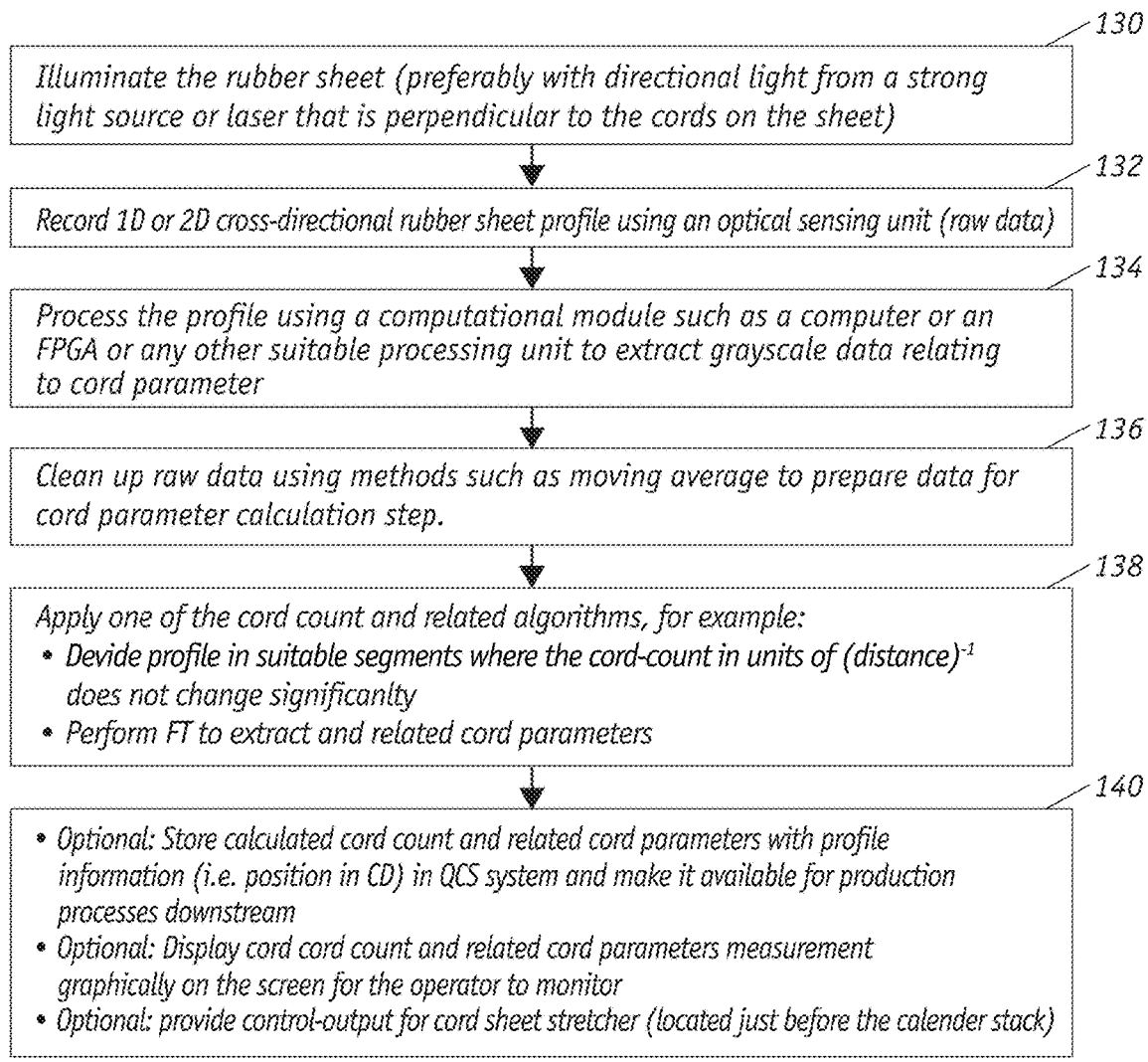
FIG. 6
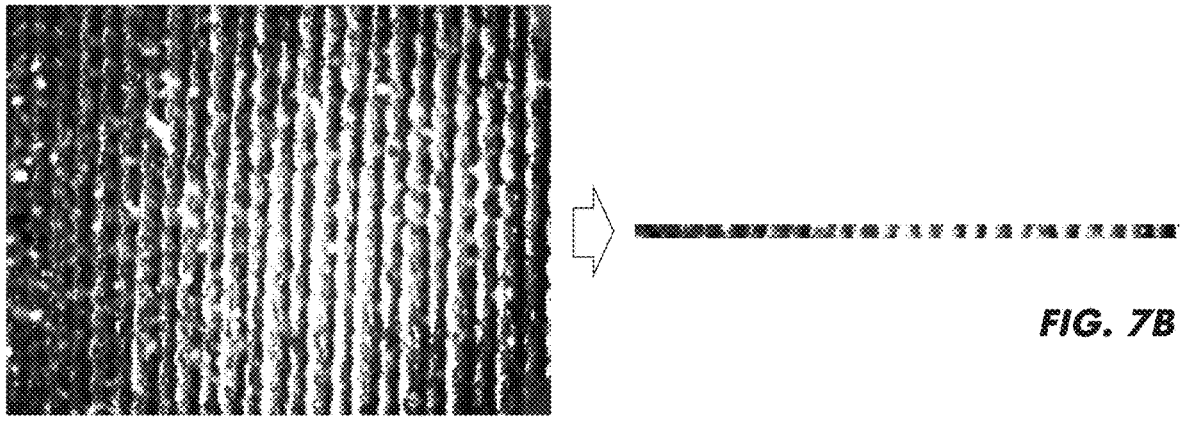
FIG. 7B
FIG. 7A

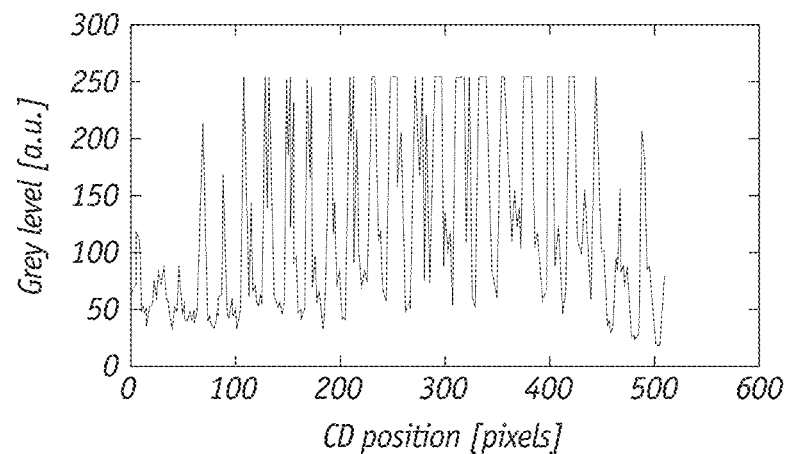
FIG. 7C
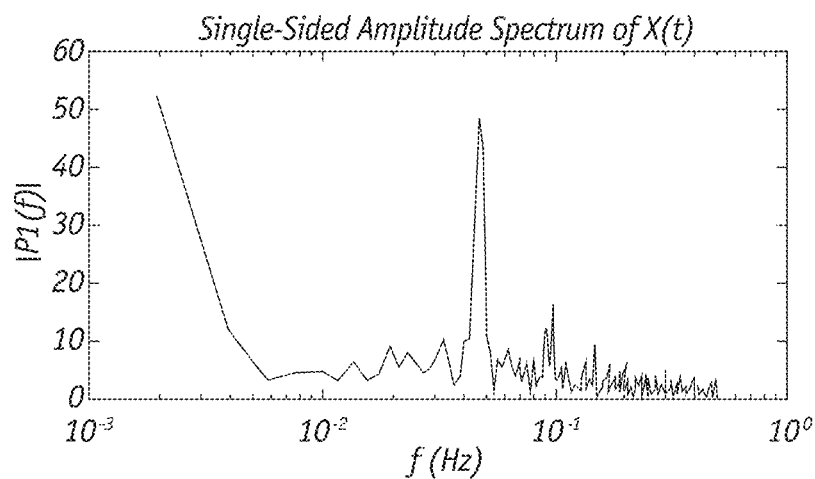
FIG. 7D
FIG. 8A
FIG. 9A
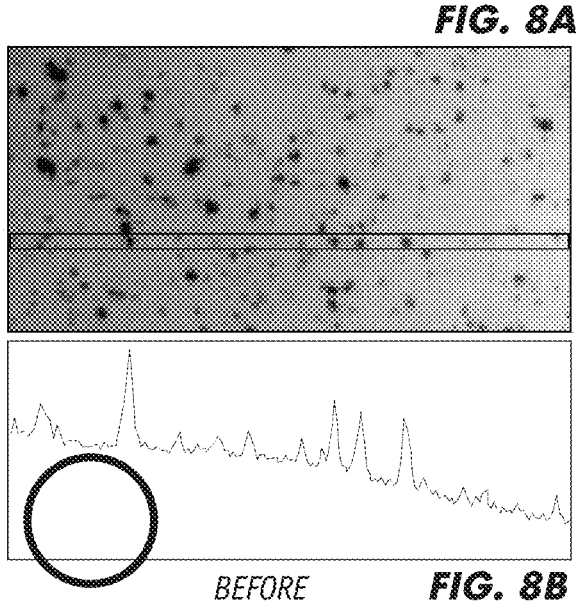
BEFORE  FIG. 8B
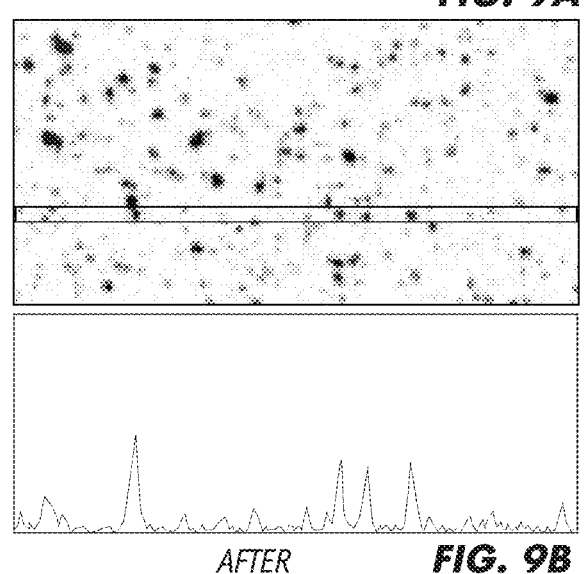
AFTER  FIG. 9B

MEASUREMENT OF TEXTILE CORD COUNT FOR RUBBER SHEET CALENDERING

FIELD OF THE INVENTION

The present invention generally relates to surface imaging techniques for counting cords, measuring cord distance, and detecting defects in the production of textile-reinforced rubber sheets that are used in tires.

BACKGROUND OF THE INVENTION

In the rubber tire calendering process, control of the manufactured sheet of tire material within precise limits is of highly significant concern. The production of rubber-coated cord within close tolerances is critical both from the standpoint of the quality of the manufactured article—optimum tire appearance, controllability, safety, and longevity—and from the standpoint of reducing the costs associated with production—minimized use of raw materials, minimized production of off-spec material, and minimized unproduction machine and manpower time. A further significant result of more accurate production control is the potential for a higher production rate brought about by a heightened confidence in the ability of the system to meet target specifications.

In the usual tire calendering process, a tire cord, comprising a layer of textile, metallic (steel), or synthetic material, is forcibly laminated between two layers of rubber by means of opposing calender rolls. These layers are usually of equal thickness, though, of course, this need not be the rule. The positioning of the tire cord within the rubber tire material laminate must be precisely controlled within close tolerances, for the reasons given above relating to tire quality and production economics.

The wire count or cord counter per unit length along the cross direction is an important quality control parameter that manufacturers wish to monitor. For steel wire reinforced laminates, x-ray-based detectors can provide wire count, wire spacing, wire diameter and other quality control measurements. However, x-ray techniques do not provide sufficient contrast between the textile cords and the rubber material to yield comparable quality control information.

SUMMARY OF THE INVENTION

The present invention is based in part on the development of surface imaging techniques for continuously monitoring digital images on the surface of a thin textile-reinforced rubber sheets in the calender machine and uses image analysis techniques to count cords, measure distance between cords, and detect defects in real time.

In one aspect, the invention is directed to a method of determining one or more cord parameters of a moving textile reinforced rubber sheet that is moving in a machine direction (MD), wherein the sheet includes a plurality of elongated textile cords embedded in the sheet and, wherein an outer surface of the sheet includes convex portions at which the cords are located and concave portions positioned between the cords are alternatively repeated, that includes:
 (a) using a light source to illuminate an area on a side of the sheet with radiation;
 (b) obtaining digital images with a camera of an illuminated area on the outer surface of the sheet;
 (c) generating a digital image of the outer surface of the sheet; and
 (d) calculating one or more cord parameters.

The elongated textile cords are preferably parallel to each other, and the elongated textile cords are orientated in a cross direction (CD) which is perpendicular to the MD. A light source is used to illuminate the area. In preferred embodiments, the digital image comprises a 2-dimensional (2D) profile, 3-dimensional (3D) map, or gray scale profile or map and the images are analyzed with Fast Fourier transform or sinusoidal fitting techniques. In additional to determining the cord count per unit length from the profile or map, with invention is also able to determine at least one of (i) cord spacing and (ii) the presence of missing cords, and/or (iii) the presence of shifted cords. The inventive method does not require a displacement sensor that scans the outer surface of the sheet.

The light source can be monochrome or polychrome and the character of illumination can differ between illumination angles. Although the wavelength of the radiation is not critical, ultraviolet, near-infrared, and particularly visible radiation are preferred. For instance, for the telecom wavelength of 1550 nm, there are a multitude of conventional light/laser sources and detectors that can be employed.

In another aspect, the invention is directed to a system for monitoring one or more cord parameters of a moving textile reinforced rubber sheet that is moving in a machine direction (MD), wherein the sheet includes a plurality of elongated textile cords embedded in the sheet and, wherein an outer surface of the sheet includes convex portions at which the cords are located and concave portions positioned between the cords are alternatively repeated. The system includes:
 (a) a light source that illuminates an area on a side of the sheet;
 (b) means for obtaining a digital image of an illuminated area on the outer surface of the sheet; and
 (c) a computing device configured to analyze the digital image and to generate a profile of the outer surface of the sheet and to determine a cord parameter.

BRIEF DESCRIPTION OF THE DRAWINGS

FIG. 6 is a process flow-diagram for measuring textile cord count and related parameters;

FIG. 7A is the raw image of a textile-reinforced rubber sheet surface;

FIG. 7B is an image of an extract slice from the image in FIG. 7A;

FIG. 7C is the extracted image intensity profile along the x axis for the image slice of FIG. 7B;

FIG. 7D is the image spectrum (frequency domain) obtained with Fast Fourier transform (FFT);

FIGS. 8A and 8B are the image and surface patterns, respectively, before application of the rolling ball algorithm for nonuniform background illumination subtraction; and FIGS. 9A and 9B are the image and surface patterns, respectively, after application of the rolling ball background subtraction.

DETAILED DESCRIPTION OF THE PREFERRED EMBODIMENTS

Figure 1:
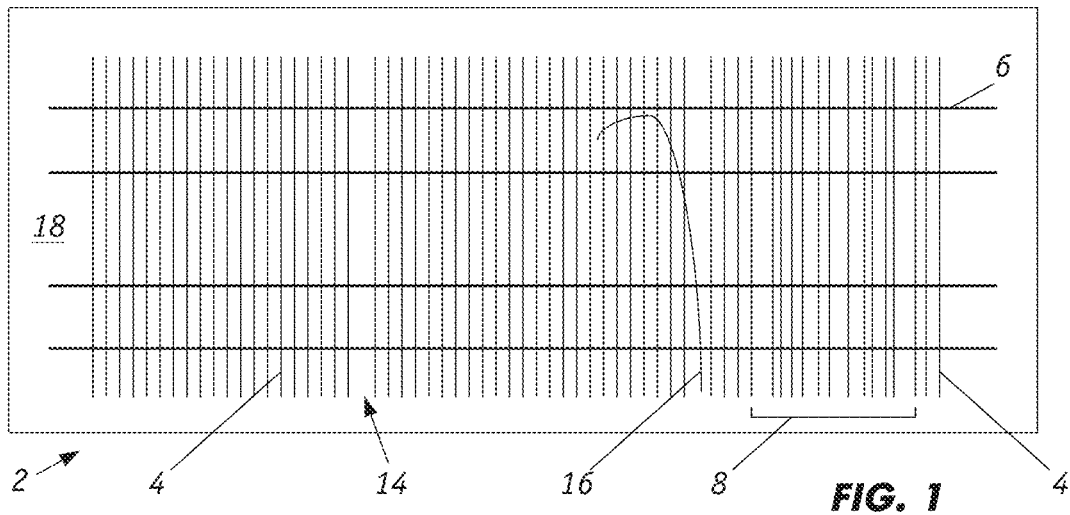
FIG. 1 is a plan view of a schematic of a textile-reinforced rubber sheet.

FIG. 1 illustrates a sheet or web 2 of textile-reinforced rubber which includes a textile mesh coated in rubber. The textile mesh contains dense, elongated textile cords 4 that are arranged perpendicular to a calender roll (or parallel to the machine direction) and sparse, long perpendicular cross threads 6, which help the raw web of cords in shape prior to the calendering process. That is, the threads 6 hold the raw cords 4 together so that they form a sheet of cords prior to calendering wherein rubber is coated onto the sheet of cords. Cords 4 are typically 0.1 to 4.0 mm and preferably 0.3 to 2.0 mm in diameter and are typically spaced 0.1 to 10.0 mm and preferably 0.2 to 5.0 mm apart as measured from the center of each cord. In this depiction, for example, parallel cords 4 are 0.5 mm in diameter and are 1 mm apart and the perpendicular supporting threads 6 provide the necessary stability to shape the plurality of cords 4 into a sheet of cords prior to calendering. The present invention is particularly suited for monitoring the plurality of elongated textile cords 4 and establishing cord count and related features.

The representative textile-reinforced rubber sheet 2 in FIG. 1 depicts three of many possible defects including a missing cord in space 14, shifted or misaligned cord 16, variability in cord-spacing along the cross direction as shown in region 8. The textile cords may be arranged into a fabric-like structure, with individual cords running parallel to each other, prior to being covered with rubber 18. The textile cords may be covered with a rubber composition as a result of various processes such as calendering a rubber sheet or sheets over the cords or extruding the cords with the rubber composition. The term "textile" as used in the phrase "textile cords" is intended to encompass cords made from natural or synthetic material (or fibers), non-limiting examples of which include PET (polyethylene terephthalate), PVA (polyvinyl alcohol), polyester, RAYON, aramid (such as KEVLAR), and NYLON. A metal cord, such as steel cord, is not a textile cord; thus, the textile cord may also be described as non-metallic.

The rubber 18 typically comprises a mixture of various types of synthetic and natural rubber. For instance, mixtures of styrene-butadiene rubber and polybutadiene rubber are commonly used as a rubbery material for automobile tire treads.

Figure 2:
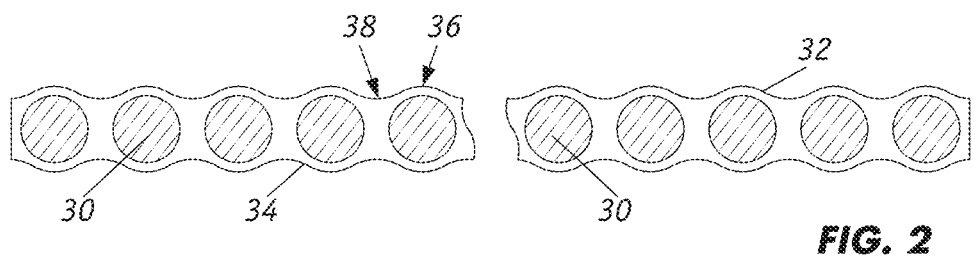
FIG. 2 is side cross-sectional view of a textile-reinforced rubber sheet.

As shown in FIG. 2, the textile-reinforced rubber sheet or web is typically thin, and the surfaces of the rubber shows a characteristic series of convex and concave portions corresponding to the underlying textile mesh. The textile-reinforced rubber sheet is typically 0.1 to 5.0 mm and preferably 0.2 to 2.0 mm thick. With the present invention, the imprint of the textile cords 30 is visible on the upper and lower surfaces 32, 34 of the textile-reinforced rubber sheet. The convex-shaped protrusion portions or regions 36 on the surface 32 correspond to the positions of the cords 30 and the concave-shaped recessed portions or regions 38 on the surface 32 correspond to areas between the cords 30. The textile-reinforced rubber sheet has a plurality of parallel arranged cords 30 embedded in rubber. With the present invention, an optical measurement can capture images of the contours on the surfaces which can used to analyze the cords. Textile-reinforced rubber sheets that are excessively thick and/or where the cord diameters are very small may not have surface contours with sufficient distinguishing features.

The term "covered" as used in the phrases "textile cords covered with a rubber composition" and "rubber-covered textile cords" is intended to encompass textile cords whose outer surface is almost entirely or entirely enveloped in rubber (i.e., a rubber composition). The term "ply" refers to a layer of rubber-covered textile cords useful in building a tire. Multiple layers of such material are referred to as plies. The textile cords of the ply are usually arranged into a fabric-like structure with individual cords running parallel to each other, prior to being covered with rubber.

Figure 3A:
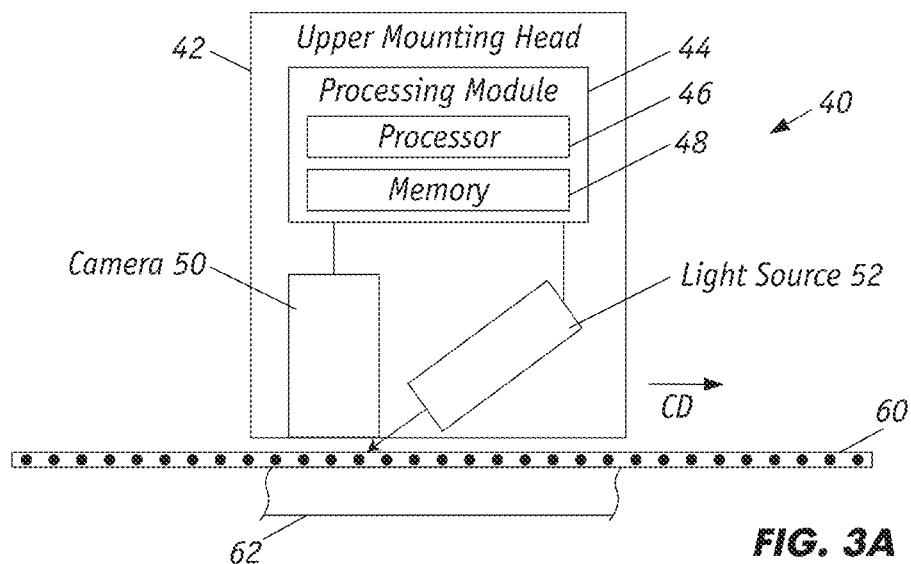
FIGS. 3A and 3B depict an imaging apparatus operating in the reflective mode employed in analyzing a textile-reinforced rubber sheet in a calendering machine.

As shown in FIG. 3A, an apparatus 40 operating in the reflective mode for measuring the textile cord count or detect cord defects of a moving textile-reinforced rubber sheet or web 60 includes an upper mounting head 42. The sheet 60 is supported by roller 62 which keeps web 60 from fluttering in space to maintain a relatively constant distance between sensing unit mounting head 42 and sheet 60. A gap between the mounting head 42 and roller 62 define a measurement channel through which sheet 60 travels in the machine direction (MD, see FIG. 3B), as the mounting head 42 travels in the cross direction (CD), which is perpendicular to the MD.

The upper mount head 42 includes an imaging device 50 and a light source 52 that are both positioned above the sheet 60. The imaging device 50 is typically a camera that is equipped with appropriate optics, e.g., lenses, to focus light that is reflected from an image area into the camera. In this reflective mode configuration, surface images of the moving sheet 60 are derived from light that is reflected from the surface. The reflective mode of operation is particularly suited for measuring cord count and other cord characteristics of the textile-reinforced rubber sheet that is opaque. Light from the light source 52 is directed toward the sheet 60 to illuminate an area on the surface and the imaging device 50 detects images from an image area which is within the illuminated area. The size of the illumination area is selected so that it is large enough to permit the imaging device 50 to image an area that covers at least 2 but preferably about 50 to 100 cords along the CD.

The imaging device 50, which includes a camera and accompanying imaging optics, and the light source 52 are configured so that the image scale is sufficient to allow the protrusion regions 36 and recessed regions 38 (as shown in FIG. 2) in the moving textile-reinforced rubber sheet to be discerned. The digital images formed are analyzed with the processing module or computer 44 that includes a processor 46 and memory 48, which can be wirelessly coupled or more typically coupled over an Ethernet connection. The processor 46 can comprise a digital signal processor (DSP), a microcontroller, an application specific integrated circuit (ASIC), a general processor, or any other combination of one or more integrated processing devices.

Conventional lenses can be employed with the camera when the moving sheet 60 is stable so that its distance from the imaging device 50 is relatively constant which is the case when the sheet 60 is adequately supported by roller 62. However, if aerodynamic effects cause the moving sheet 60 to flutter or otherwise shift its vertical position relative to the imaging device 50, a telecentric lens system that creates a large depth of field can be used so that fluctuations of the sheet 60 relative to the camera results in no change in image size. Illumination from the light source 52 is directional typically at an angle that is from about 10° to 80° to normal.

The low-angle illumination is perpendicular to the cord direction which improves the contrast. The presence of shadows facilitates analysis.

Figure 3B:
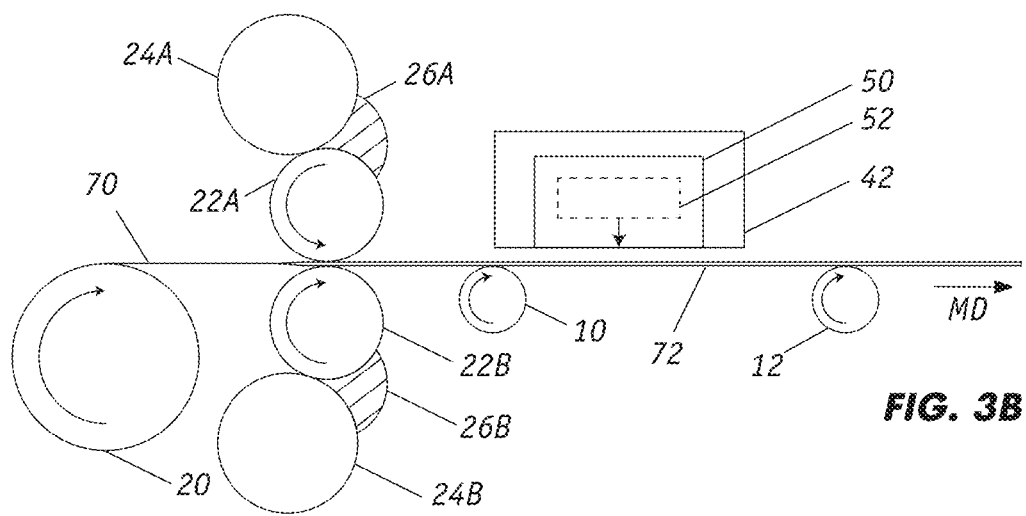

FIG. 3B depicts the operation of the upper mounting head 42 with a rubber coating calendering apparatus. The textile-reinforced rubber sheet 72 is produced in a calendering machine wherein an array of cords 70 is fed between rubber composition members. Calendering machines are described, for instance, in U.S. Pat. No. 5,002,621 to Ikeda and US 2016/0089806 to Takeuchi, which are incorporated herein by reference. A calender machine includes a plurality of rolls that guide the array of cords 70 and press the rubber onto the array to form a sheet of textile-reinforced rubber. As depicted in FIG. 3B, feed rolls 24A and 24B supply rubber material 26A and 2613 between press rolls 22A and 22B, respectively, that is applied onto the array of cords 70. Roll 20 is unwound by an unwinder and supplies a continuous sheet comprising the array of cords 70 that moves in the MD. The sheet of array of cords 70 is continuously coated with rubber by the calendaring process to produce textile-reinforced rubber sheet 72 which is supported by rolls 10, 12. The mounting head 42, which moves in the CD, includes an imaging device 50 and a light source 52 which is positioned behind (or in front of) the imaging device 50.

Figure 4:
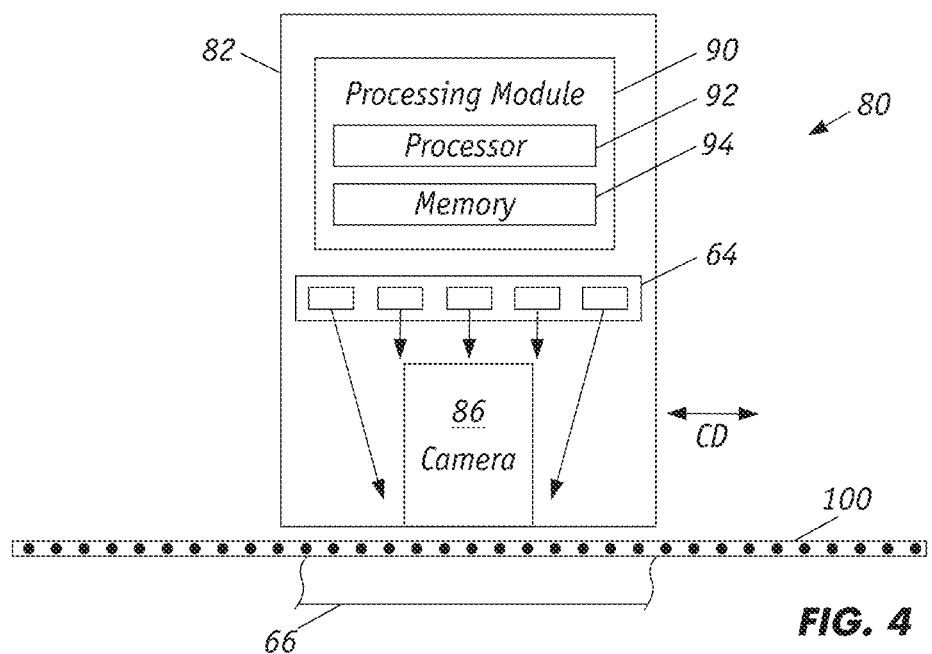
FIG. 4 depicts an imaging apparatus employed in analyzing a textile-reinforced rubber sheet that incorporates multiple source lights.

FIG. 4 illustrates another apparatus 80 for measuring cord count and related characteristics of a textile-reinforced rubber sheet or web 100, which is supported by roller 66. The apparatus 80 has an upper mounting head 82, imaging device 86 and annular light source 64. The annular light source 64 includes plurality of light emitting devices configured for directional illumination that arranged is symmetric around the optical axis of the imaging device 86. The apparatus also includes a processing module 90, processor 92 and memory 94. Alternately, illumination can be a uniform light source such as a ring light.

For instance, an annular-shaped light source where the illumination from the light source to the sheet is directional, typically at an angle that is from about 10° to 80° to normal, can be employed. Light sources that generate multiple beams of light with multiple angles of illumination can be employed. The illumination can be derived from an array of light sources that are distributed in one or more concentric annuli such that the illumination is substantially symmetrical around their common axis. Different light beams can be directed at the sheet 100 either simultaneously or sequentially.

For the illumination in apparatuses shown in FIG. 3A, 3B, or 4, the light sources preferably provide high intensity illumination that consists of a constant stream of energy within a wavelength required for measurement. The light sources can be amplitude modulated by conventional mechanical devices such as choppers, shutters, tuning forks and the like to enhance the signal-to-noise ratio. Another exemplary modulating technique employs electro-optical shutters such as Kerr cells and Pockels cells that are positioned in the light beam path of the light source and acousto-optical devices such as acousto-optical tunable filters. Alternatively, direct modulation of a drive current that is coupled to the light source to generate pulsed illumination can be used.

Preferred light source devices include light-emitting diode (LED), laser diode, or an array of LEDs or laser diodes, tungsten or halogen light sources. When the light source is modulated to create a stroboscopic flash effect, for instance, a high modulation rate is preferred. The resulting short exposure times allow the imaging devices, with correspondingly short integration times, to obtain better images of the image area by reducing or eliminating the adverse effects caused by motion-blurring in the direction of movement of the sheet. In the case of a charge-coupled device (CCD), a short integration time lets pixels collect less light and a longer integration time lets pixels collect more light. Alternatively, or in addition to modulating the light source, the imaging device, that operates at a high exposure rates, i.e., short integration times, can be selected. In this case, the illumination can be continuous which makes it is easier to maintain consistent illumination at different measurements. The camera can comprise a line-camera, single-point sensor (photo-detector) flat illumination, steep illumination angle, uniform illumination, directional illumination.

Figure 5A:
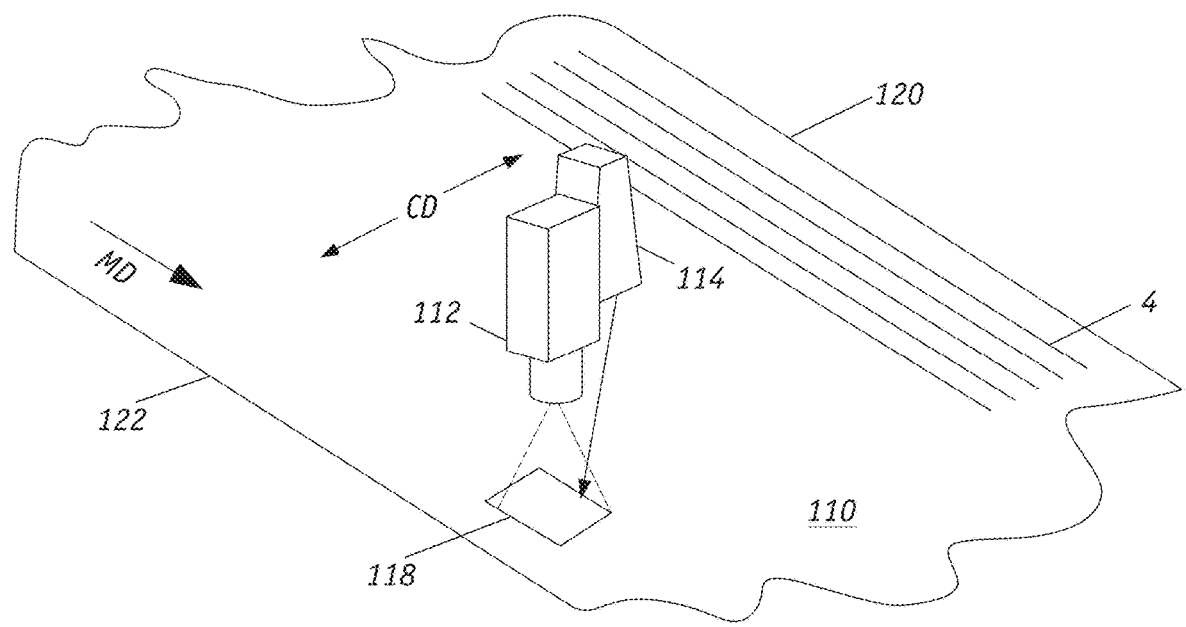
FIGS. 5A and 5B illustrate operations of a scanning sensor for monitoring a moving textile-reinforced rubber sheet.

FIG. 5A illustrates a scanning mechanism wherein a sensor operating the reflective mode continuously images the surface of a thin fabric-reinforced rubber located downstream from a calender machine (not shown) and uses an image analysis method to count cords, measure distance between cords, and detect defects in real time. In this example, the sensor includes a camera 112 and light source 114, which are oriented along the CD, and that are positioned above a textile-reinforced rubber sheet 110 which includes elongated cords 4. The sheet with outer edges 120 and 122 moves in the machine direction. The camera 112 and light source 114 can be housed in scanning mounting or sensor head that is secured to parallel elongated members or rails (not shown). The mounting head on the rails scans back and forth across the sheet in the cross direction (CD), which is perpendicular to the MD. In operation, light from light source 114 illuminates an illumination area 118 on the upper surface of sheet 110 and camera 114 captures images from the image area that is focused into the camera. As the sensor moves in the CD, the light source 114 generates a series of illuminated areas.

Figure 5B:
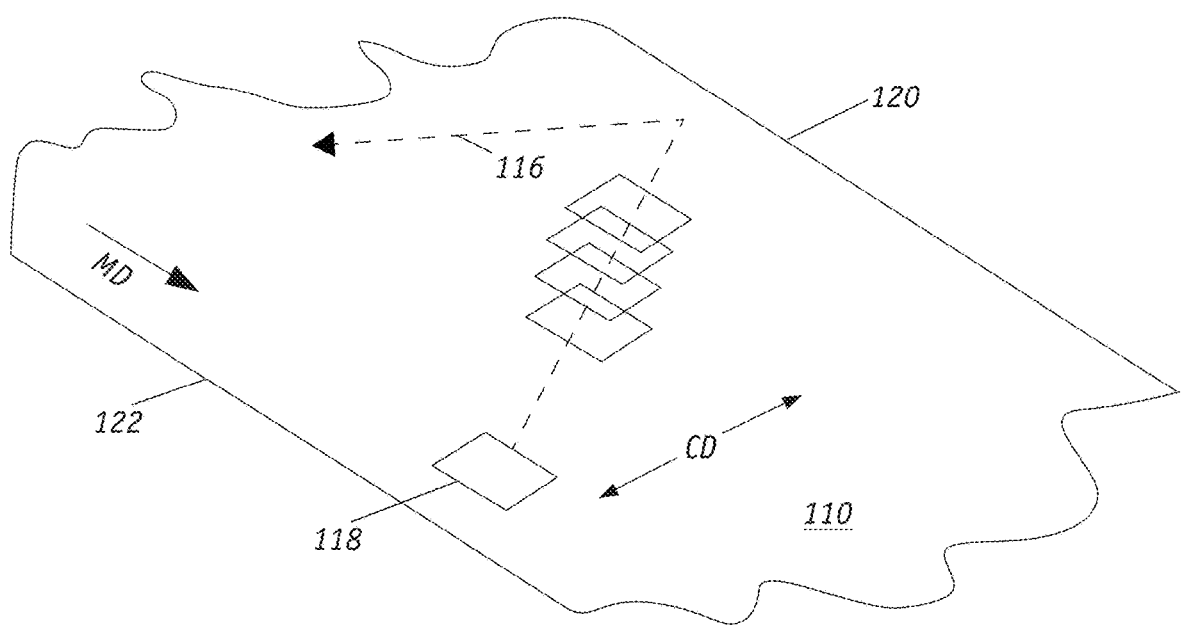

The scanning sensor measures the selected features of the textile cords at locations between the longitudinal edges 120, 122 of sheet 110. However, because of the sheet velocity, the scanning sensor consisting of the light source and camera scans diagonally across the moving surface, with the result that consecutive scanning paths have a zig-zag pattern 116 with respect to the direction perpendicular to the longitudinal edges 120, 122, as shown in FIG. 5B. The camera takes a series of overlapping images along the scanning path or profile 116. The angles of the scanning path or profile 116 relative to the true CD depend upon the cross-directional velocity of the scanning device and upon the machine-directional velocity of the sheet 110 which is known.

Instead of employing a scanning sensor, one or a plurality of stationary sensors can be used. For example, a plurality of sensors can be strategically positioned along the width of the sheet 110 (FIG. 5A). Each static sensor provides only fixed-point measurements. Multiple stationary sensors would be needed to cover the entire sheet in the CD, which would enable the measurement to detect short-lasting cord defects. It is expected that the rubber at the edges 120, 122 of the textile-reinforced rubber sheet 110 is subject to higher tension or stretching than the rubber at the center of the sheet. The number and types of defects in the textile cords are not uniformly distributed so manufacturers can position the senor(s) in the positions along the CD that are most critical. When employing one or more static sensors, the cameras should have enough resolution to cover the entire sheet width. The illumination must also be adequate as well. One technique is to employ multiple-angled light sources directing radiation into the same direction.

The camera in FIG. 5A can be line scanner consisting of a camera that reads the image data one line at a time. The line scan sensor has one or more lines of pixel sensors. During the camera's exposure time each pixel accumulates photoelectric charges proportional to the light from the textile-reinforced rubber sheet 110 imaged onto the pixel. At the end of the exposure time, the charges in an entire row of pixels are transferred into a readout register. In this fashion, line-arrays are captured.

FIG. 6 outlines some of the steps in implementing the surface imaging to ascertain textile cord count and other characteristic of a sheet of textile-reinforced rubber. In the initial step 130, the rubber sheet is illuminated preferably with directional light that is perpendicular to the cords within the sheet. Next in step 132, a one-dimensional or two-dimensional profile of the rubber sheet is recorded with a camera. In step 134, a computer analyzes the profile to extract one or more of the following parameters: the cord-count, cord-spacing, cord defects and/or cord-count uniformity and variations. Cord defects include, for example, the presence of broken or loose cords, missing cords, and overlapping cords. Steps 136 and 138 consist of cleaning up the raw data and applying a cord-count algorithm to ascertain the cord-count and related information. In step 140, the cord-data and related data can be stored and used in a quality control system to enhance calender machine performance.

To demonstrate the effectiveness of surface imaging techniques of the present invention, a sample consisting of a textile-reinforced rubber (12 cords/mm and 1.5 mm thick) was exposed to a high-intensity pulsed laser illuminating the surface. The angle of incidence was 45 degrees. A camera captured images of the sample surface which were analyzed. FIG. 7A shows the raw image of the textile-reinforced rubber sheet surface that was captured. FIG. 7B shows a slice of the raw image and FIG. 7C is the light or grey level intensity profile derived for the slice. FIG. 7D is the image spectrum (frequency domain) that was obtained by Fast Fourier Transform (FFT). For the intensity profile in FIG. 7C, the periodicity and the distance between cord under the surface of the rubber sheet in the image were ascertained. Since the magnification, the distance of the sheet, and other camera parameters are known, this image-periodicity and other cord-related information can be translated into selected parameters for the actual sheet which have suitable and meaningful units as cords per millimeter.

Fast Fourier Transform (FFT) Algorithm. This algorithm is used to extract the cord count from surface images of the imaged rubber surface.

From the image shown in FIG. 7A of a textile-cord reinforced rubber sheet that was captured by a camera as the rubber surface was illuminated by a laser, two important features are apparent. First, the illumination pattern is not uniform across the surface, with the illumination being most intense at the center and gradually decreasing towards the edges. Second, the presence of the parallel vertical lines can be used to determine the cord count in the rubber. Although optional, the first step in the analysis is to correct for the effects of non-uniform background. This can be achieved by subtracting the background which is caused by the non-uniform illumination.

FIGS. 8A and 8B are the image and surface patterns, respectively, before application of the rolling ball algorithm for nonuniform background illumination subtraction. FIGS. 9A and 9B are the image and surface patterns, respectively, after application of the rolling ball background subtraction. For this subtraction, the "rolling ball" background determination algorithm described in Stanley Sternberg's article, "Biomedical Image Processing", IEEE Computer January (1983), 22-34, is employed. This algorithm represents an image as a 3D surface with the pixel values of the image being the height, then the rolling ball over the surface creates the background. FIGS. 8A and 9A show representative images before and after the "rolling ball" background subtraction. FIGS. 8B and 9B show the corresponding surface patterns before and after the "rolling ball" background subtraction. After the subtraction, the illumination gradient disappeared, wile the surface pattern of interest remains preserved. With the present invention which is directed to analyzing the surface of textile-cord reinforced rubber sheets, the rolling ball algorithm requires user to specify the radius of the ball, and the radius should not be smaller than the distance between two cords on the rubber surface. The rolling ball algorithm can be implemented using MATLAB software. In the case where the cord-count varies along the CD, the FFT of snapshots/images that are next to each other would show a changing frequency component.

After the background is subtracted, the image is analyzed with Fast Fourier Transform which converts the image from the spatial signal into the frequency domain. With the present invention, FFT can determine which frequencies dominate in the image, and from these frequencies the periodicity of the pattern created by the textile cord reinforcement in the rubber can be inferred. The FFT cannot be directly applied to the entire image, hence it is necessary to extract a slice of, for example, 5-10 pixels in the relevant direction. The relevant direction is parallel with the calender roll and perpendicular to the textile cords.

After the image slice is extracted, the pixels are sum up in the y direction $X_i = \Sigma_j x_{ij}$ to obtain the intensity profile along x-axis. Here, $x_{ij}$ are pixel values of the image after the background subtraction and $X_i$ is the profile intensity along x-axis as plotted in FIG. 7C. This intensity profile is simply an array of numbers and applying discrete FFT to this profile generates a spectrum in the frequency domain. Conventional algorithms such as the Cooley-Tukey PPT algorithm can be used. The image spectrum in frequency domain shown in FIG. 7D was obtained with an FFT algorithm available in MATLAB.

The spectrum in FIG. 7D exhibits one dominant frequency at $5 \times 10^{-2}$ per pixel. The signal period is the inverse frequency which is estimated to be $(1/(5 \times 10^{-2})) = 20$ pixels. This result supports the conclusion that the characteristic pattern in the image shown in FIG. 7B repeats every 20 pixels in the image; hence, the average distance between two adjacent cords is 20 pixels. Taking into account the optical magnification, this corresponds to 22 cords per millimeter in the cross direction of the rubber sheet.

The above illustrative example of the present invention, which is designated as Method 1, can be summarized as follows:
  (a) obtain a digital image of the surface of a textile-reinforced rubber sheet (FIG. 7A).
  (b) select a line or slice of one or more pixels height from the image (FIG. 7B) and the extract the image intensity profile along the x axis for the image slice of FIG. 7C.
  (c) perform a Fourier transformation to extract the frequency of the cords appearing along the line.
  (d) convert the frequency into cord count per unit length, cord spacing and other cord-related parameters.

It is expected that the separation between cords located in the vicinity of the center of a sheet of textile-reinforced rubber to be different from those near the sheet edges because the rubber is more stretched towards the edges. Thus, the algorithm should not average over the entire rubber sheet, it should rather keep track where along the calender the image was taken.

EXAMPLES

The following examples (methods) illustrate additional techniques for ascertain textile cord data from the digital images. All the alternative methods below share the first and last steps (a) and (d), namely:

Step (a) which is obtaining a digital image of the surface of a textile-reinforced rubber sheet (FIG. 7A); and Step (d) converting the frequency into cord count per unit length, cord spacing and other cord-related parameters.

All the image analysis examples (Methods 2-8) outlined herein employ conventional image analysis techniques. It is understood that other techniques can be used to yield similar intensity or binary maps or profiles to extract cord count, spacing and other cord-related parameters.

Method 2: Is a variation of the Method 1.
  (a) obtain a digital image of the surface of a textile-reinforced rubber sheet (FIG. 7A).
  (b) select a line or slice of one or more pixels height from the image (FIG. 7B) and the extract the image intensity profile along the x axis for the image slice of FIG. 7C.
  (c) partition FIG. 7C into segments of predefined length and perform a segment-wise fit of a sinusoidal waveform to determine the period the cords in each segment.
  (d) convert into cord count per unit length in each segment. This allows for the monitoring of CD cord-spacing variations.
  (e) the goodness of fit (figure of merit) will indicate if a defect (such as a missing cord) is present. In this case, a defect-finding image analysis algorithm can be triggered to reveal more details about the defect in the cord pattern. (chuck-pattern recognition).

Method 3:

Perform Method 1 or Method 2 on the entire image and not just on a horizontal segment. This is possible if the image-vertical is parallel to the cords.

Perform this procedure by averaging the intensities vertically producing one averaged line-profile. The advantage of this method is that it reduces noise in low-contrast situations, but it will mask local defects and will only work well if the cords are perpendicular to the average direction and do not wander in the cross direction. Extracting the cord frequency/spacing (part c) and converting to cord count and other relevant parameters (part d) is analogous to Method 1 or Method 2.

Method 4:

This method uses the image analysis technique of segmenting by turning the intensity turning map of the image into a binary map of "above" and "below" threshold. Segmentation techniques include, for instance, thresholding, auto-clustering, using morphology, using color thresholds, Gabor filters, and volume segmenters. Segmentation techniques are described in U.S. Pat. No. 10,074,256 to Au et al. and U.S. Pat. No. 11,335,006 to Wan et al., which are incorporated herein by reference.

After creating a binary map using a segmentation method, steps (c), (d) and (e) of Methods 1, 2 or 3 can be applied to the binary map to extract desired cord parameters.

Method 5:

Use the image analysis technique of autocorrelation to detect lines, determine spacing, and find the periodicity hidden in the image. Autocorrelation techniques are described in U.S. Pat. No. 11,257,388 to Shamasundar et al. and U.S. Pat. No. 8,897,593 to Suzuki et al., which are incorporated herein by reference.

Convert the frequency into cord count per unit length, cord spacing and other cord-related parameters.

Method 6:

Use the image analysis technique of co-localization to determine spacing. This is done by comparing the image to other artificially created line-images of different spacing in order to find the best match. Co-localization techniques are described in U.S. Pat. No. 11,237,627 to Gibby et al. and U.S. Pat. No. 7,282,724 to Olschewski, which are incorporated herein by reference.

Convert the frequency into cord count per unit length, cord spacing and other cord-related parameters.

Method 7:

Use image analysis technique of directional gradient fields Gx and Gy and their local magnitudes to determine spacing. Directional gradient techniques are described in U.S. Pat. No. 8,259,198 to Cote et al. and U.S. Pat. No. 5,235,281 to Haragashira et al., which are incorporated herein by reference.

Convert the frequency into cord count per unit length, cord spacing and other cord-related parameters.

Method 8:

Use the image analysis technique of Hough transform or Radon transform to detect lines before converting the intensity/grayscale map of the image into a binary map that is subsequently used to extract the cord parameters. Hough transform techniques are described in U.S. Pat. No. 9,646,221 to Takahashi et al. and Radon transform techniques for described in U.S. Pat. No. 9,218,648 to McCloskey et al. and U.S. Pat. No. 5,101,270 to Boone et al., which are all incorporated herein by reference.

In another embodiment of the invention, defects such as missing and/or shifted cords in the textile-reinforced rubber sheets can be determined by employing fitting a sinusoidal wave to the intensity profile. The goodness of fit is indicative of the presence of such defects.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method comprising:
  monitoring a textile reinforced rubber sheet while the textile reinforced rubber sheet is moving in a machine direction (MD), wherein the textile reinforced rubber sheet includes a plurality of elongated textile cords embedded in the textile reinforced rubber sheet, and wherein an outer surface of the textile reinforced rubber sheet includes convex portions at which the plurality of elongated textile cords are located and concave portions positioned between the plurality of elongated textile cords are alternatively repeated, the method including:
    (a) illuminating, by a light source, the outer surface of the textile reinforced rubber sheet with radiation;
    (b) obtaining, by an imaging device, a digital image of an illuminated area on the outer surface of the textile reinforced rubber sheet;

(c) generating, by a processor, a frequency spectrum of the digital image based on one or more parameters associated with one or more pixels in the digital image; and (d) converting, by the processor, the frequency spectrum into one or more cord parameters of the textile reinforced rubber sheet by identifying a dominant frequency in the frequency spectrum, and determining an average distance between adjacent cords of the plurality of elongated textile cords.

2. The method of claim 1, wherein the plurality of elongated textile cords are parallel to each other and step (a) comprises illuminating the outer surface of the textile reinforced rubber sheet with illumination that is directionally perpendicular to the plurality of elongated textile cords.

3. The method of claim 1, wherein step (a) employs the light source to illuminate the outer surface of the textile reinforced rubber sheet with radiation and the light source directs radiation that is 10 to 80 degrees normal to the textile reinforced rubber sheet.

4. The method of claim 1, wherein the elongated textile cords are parallel to each other and step (a) comprises, illuminating the outer surface of the textile reinforced rubber sheet with illumination and wherein the outer surface of the textile reinforced rubber sheet is arranged symmetrically around an optical axis of the imaging device.

5. The method of claim 1, wherein step (d) further comprises determining at least one of (i) spacing between one or more elongated textile cords, and (ii) one or more missing elongated textile cords, and (iii) shifting of one or more elongated textile cords between the plurality of elongated textile cords.

6. The method of claim 1, wherein the digital image comprises a 2-dimensional (2D) profile, 3-dimensional (3D) map, or gray scale profile or map.

7. The method of claim 1, wherein step (d) comprises analyzing the digital image that employs Fast Fourier transform or sinusoidal fitting techniques.

8. The method of claim 1, wherein the method further comprises, analyzing the digital image with Fast Fourier Transform for converting the digital image from a spatial signal into a frequency domain and determining the dominant frequency.

9. A system comprising:
an imaging apparatus configured for monitoring a textile reinforced rubber sheet while the textile reinforced rubber sheet is moving in a machine direction (MD), wherein the textile reinforced rubber sheet includes a plurality of elongated textile cords embedded in the textile reinforced rubber sheet and, wherein an outer surface of the textile reinforced rubber sheet includes convex portions at which the plurality of elongated textile cords are located and concave portions positioned between the plurality of elongated textile cords are alternatively repeated:
the imaging apparatus comprising:
(a) a light source configured to provide an illuminated area on the outer surface of the textile reinforced rubber sheet;
(b) an imaging device configured to capture an image of the illuminated area on the outer surface of the textile reinforced rubber sheet; and
(c) a computer device comprising a processor and a memory, the computer device configured to analyze the image and to generate a frequency spectrum of the image based on one or more parameters associated with one or more pixels in the image, and convert the frequency spectrum into one or more cord parameters of the textile reinforced rubber sheet;
wherein the computer device is configured to convert the frequency spectrum into one or more cord parameters by identifying a dominant frequency in the frequency spectrum, and determining an average distance between adjacent cords of the plurality of elongated textile cords.

10. The system of claim 9, wherein the plurality of elongated textile cords are parallel to each other and the light source illuminates the outer surface of the textile reinforced rubber sheet with illumination that is directionally perpendicular to the plurality of elongated textile cords.

11. The system of claim 9, wherein the light source directs radiation that is 10 to 80 degrees normal to the textile reinforced rubber sheet.

12. The system of claim 9, wherein the elongated textile cords are parallel to each other and the imaging device configured to capture the image of the illuminated area comprise an image detector and the light source illuminates the outer surface of the textile reinforced rubber sheet with illumination and wherein the outer surface of the textile reinforced rubber sheet is arranged symmetrically around an optical axis of the image detector.

13. The system of claim 9, wherein the image comprises a 2-dimensional (2D) profile, 3-dimensional (3D) map, or gray scale profile or map.

14. The system of claim 9, wherein the computer device is configured to analyze the image using Fast Fourier transform.

15. The system of claim 9, wherein the computer device is configured to analyze the image using sinusoidal fitting techniques.

16. The system of claim 9, wherein the imaging device configured to capture the image of the illuminated area comprises a camera that is scanned back and forth along a cross direction which is perpendicular to the MD.

17. The system of claim 9, wherein the imaging device configured to capture the image of the illuminated area comprises one or more stationary cameras that is positioned adjacent a moving textile reinforced rubber sheet.

18. The system of claim 9, wherein the one or more cord parameters of the textile reinforced rubber sheet comprises at least one of spacing between one or more elongated textile cords, one or more missing elongated textile cords, and shifting of the one or more elongated textile cords between the plurality of elongated textile cords.

19. A system comprising:
an imaging apparatus configured for monitoring a textile reinforced rubber sheet while the textile reinforced rubber sheet is moving in a machine direction (MD), wherein the textile reinforced rubber sheet includes a plurality of elongated textile cords embedded in the textile reinforced rubber sheet and, wherein an outer surface of the textile reinforced rubber sheet includes convex portions at which the plurality of elongated textile cords are located and concave portions positioned between the plurality of elongated textile cords are alternatively repeated, that comprises:
(a) a light source that illuminates an area on a side of the textile reinforced rubber sheet;
(b) a camera that is configured to obtain a digital image of an illuminated line on the outer surface of the textile reinforced rubber sheet wherein the camera captures line array images; and a computer comprising a processor and a memory, the computer configured to analyze the digital image and to generate a frequency spectrum of the digital image based on one or more parameters associated with one or more pixels in the digital image, and convert the frequency spectrum into one or more cord parameters of the textile reinforced rubber sheet;

wherein the computer is configured to convert the frequency spectrum into one or more cord parameters by identifying a dominant frequency in the frequency spectrum, and determining an average distance between adjacent cords of the plurality of elongated textile cords.

* * * * *